United States Patent
Huang et al.

(10) Patent No.: US 7,296,185 B2
(45) Date of Patent: Nov. 13, 2007

(54) DEVICE FOR DEBUGGING AND METHOD THEREOF

(75) Inventors: Chung-Ching Huang, Taipei (TW); Hao-Lin Lin, Taipei (TW)

(73) Assignee: Via Technologies, Inc., Taipei (TW)

( * ) Notice: Subject to any disclaimer, the term of this patent is extended or adjusted under 35 U.S.C. 154(b) by 524 days.

(21) Appl. No.: 10/820,768

(22) Filed: Apr. 9, 2004

(65) Prior Publication Data

US 2005/0060617 A1 Mar. 17, 2005

(30) Foreign Application Priority Data

Sep. 16, 2003 (TW) ............... 92125534 A

(51) Int. Cl.
*G06F 11/00* (2006.01)
(52) U.S. Cl. ............... 714/30; 714/31; 714/34
(58) Field of Classification Search ............ 714/34, 714/30, 31
See application file for complete search history.

(56) References Cited

U.S. PATENT DOCUMENTS

| | | | | |
|---|---|---|---|---|
| 5,357,628 | A | * | 10/1994 | Yuen ..................... 714/34 |
| 5,682,310 | A | * | 10/1997 | Pedneau et al. .......... 710/261 |
| 5,729,760 | A | | 3/1998 | Poisner |
| 5,796,984 | A | | 8/1998 | Pearce et al. |
| 5,838,897 | A | * | 11/1998 | Bluhm et al. ............ 714/30 |
| 6,209,083 | B1 | | 3/2001 | Naini et al. |
| 6,272,618 | B1 | | 8/2001 | Tyner et al. |
| 6,282,601 | B1 | | 8/2001 | Goodman et al. |
| 6,480,914 | B1 | | 11/2002 | Hsieh |
| 6,571,206 | B1 | | 5/2003 | Casano et al. |
| 6,615,368 | B1 | * | 9/2003 | Dunlap .................... 714/30 |
| 6,636,962 | B1 | | 10/2003 | Sun et al. |
| 6,711,642 | B2 | | 3/2004 | Huang |
| 6,968,410 | B2 | | 11/2005 | Bennett et al. |
| 2001/0016892 | A1 | * | 8/2001 | Klein .................... 710/260 |
| 2002/0099893 | A1 | | 7/2002 | Nguyen et al. |

FOREIGN PATENT DOCUMENTS

EP 0996061 4/2000

* cited by examiner

*Primary Examiner*—Yolanda L Wilson
(74) *Attorney, Agent, or Firm*—Rosenberg, Klein & Lee

(57) ABSTRACT

A debugging device and method are provided, including a central processing unit (CPU) connected to a chipset with a system management interrupt pin. The debugging method includes sending out a system management interrupt signal to central processing unit from the system management interrupt pin of the chipset. Then the CPU moves into a system management mode and pops out a debugging operation window for selecting and executing each debugging item. After the execution of each debugging item is completed, the CPU will leave the debugging operation window and return to the next instruction before debugging. After the execution of each debugging item is completed in the debugging operation window, the CPU will return to the operation system and continue the execution of next instruction before debugging. The execution of debugging will not influence the status and the program execution from the operating system. The disclosed debugging method is convenient for executing each debugging item at any time.

11 Claims, 3 Drawing Sheets

DEVICE FOR DEBUGGING AND METHOD THEREOF

FIELD OF THE INVENTION

The present invention is related to a device for debugging and method thereof, particularly to a debugging device and method, transparent with operating system.

BACKGROUND OF THE INVENTION

In the current computer system, system designers usually have some difficulties of hardware and software in designing and debugging motherboard. Generally, the designers solve those problems with debugging engine or software debugging program. For example, logical analyzer (LA) and SCOPES is used to sample working period of PCI and wave pattern of signal and hardware ICE is used to capture the instruction flow of CPU, or software ICE is used to capture the instruction flow of operating system.

However, these hardware tools such as LA, SCOPES, hardware ICE, etc. are very expensive, and whose operation procedures are too complicated to meet the demand of users interface. On the other hand, although the costs of debugging by software ICE tool program are not as expensive as hardware tools, they are not cheap, either. And, the usage of software tool program is limited while operating system is starting at the power-on stage; however, some other bugs are still may happen before the system initiated. Furthermore, debugging system by software ICE tool program will change the execution procedure from operating system that would cause other unpredictable bugs. This is why the usage of software ICE tool program is not an effective choice.

Thus, the main purpose of present invention is to develop an effective and low cost debugging tool that makes system design more convenient and the debugging procedure simpler.

SUMMARY OF THE INVENTION

Accordingly, it is therefore a primary object of the present invention to provide a device for debugging and method thereof, providing a debugging tool program stored in the system management mode section of basic input output system (BIOS). The debugging tool program could be triggered by system management interrupt signal to achieve the purpose of debugging at any time.

A secondary object of the present invention is to provide a device for debugging and method thereof, displaying the debugging operation window from the debugging tool program, for selecting and executing each debugging item to achieve the purpose of simple and convenient operation.

Another object of the present invention is to provide a device for debugging and method thereof, transparent with CPU to reduce other bugs caused during the debugging procedure.

Therefore, for achieving aforementioned objects, the primary method according to one preferred embodiment of the present invention includes a method for debugging, presented in a computer system, wherein the computer system includes a CPU connected to a chipset with system management interrupt pin, the method thereof comprising steps of sending a system management interrupt signal to CPU through the system management interrupt pin of chipset; the CPU move into a system management mode and execute popping out a debugging operation window for selecting and executing each debugging item; and after the execution of the debugging procedure completing, leaving the debugging operation window and returning to the next instruction before debugging.

For achieving aforementioned objects, the primary structure according to one preferred embodiment of the present invention includes a CPU connected to at least one memory and a chipset with at least one system management interrupt pin to connect with CPU; a system management mode section provided in the memory; and a debugging tool program displayed from a debugging operation window provided inside the system management mode section.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE EMBODIMENTS

The structural features and the effects to be achieved may further be understood and appreciated by reference to the presently preferred embodiments together with the detailed description.

The current Central Processing Unit (CPU), such as Intel Pentium 4 and AMD K8, both provide system management mode (SMM) for users to control the system management by a firmware, such as BIOS, and the system management mode is transparent with operating system (OS). The system management mode could be triggered by a system management interrupt signal (SMI#). The system management interrupt is generated by system management interrupt signal through SMI# pin for Intel P4 CPU, or SMI# massage for AMD K8 CPU. When the CPU receives the system management interrupt signal, it moves into the system management mode for executing the predetermined program, which is stored in the system management mode section. After end of execution, the CPU will leave the system management mode and return to OS by a resume instruction (RSM). According to this characteristic, the present invention provides a debugging tool program stored in the system management mode section of BIOS for the operation of users.

Figure 1:
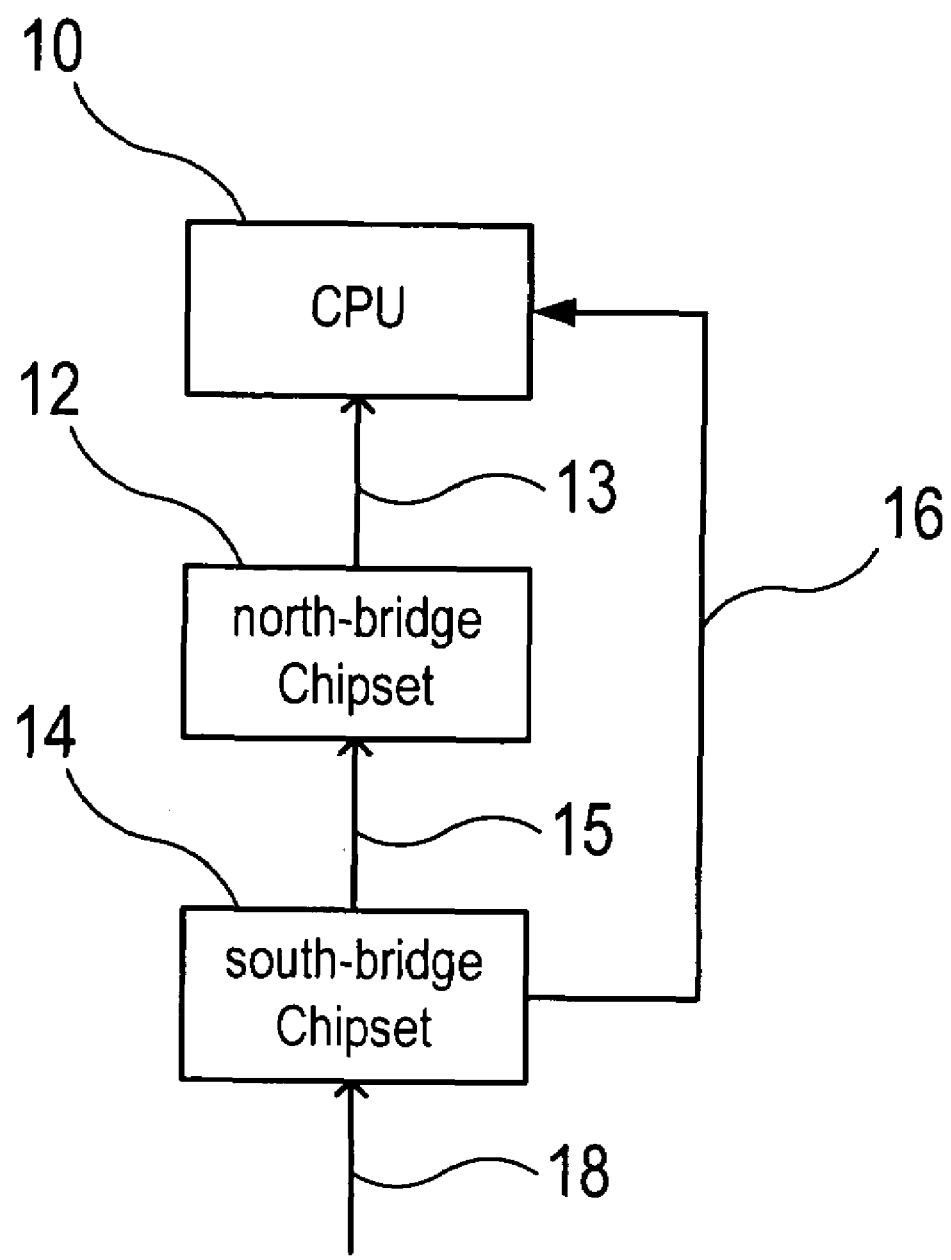
FIG. 1 is a block diagram of a device for debugging according to one preferred embodiment of the present invention.
Figure 2:
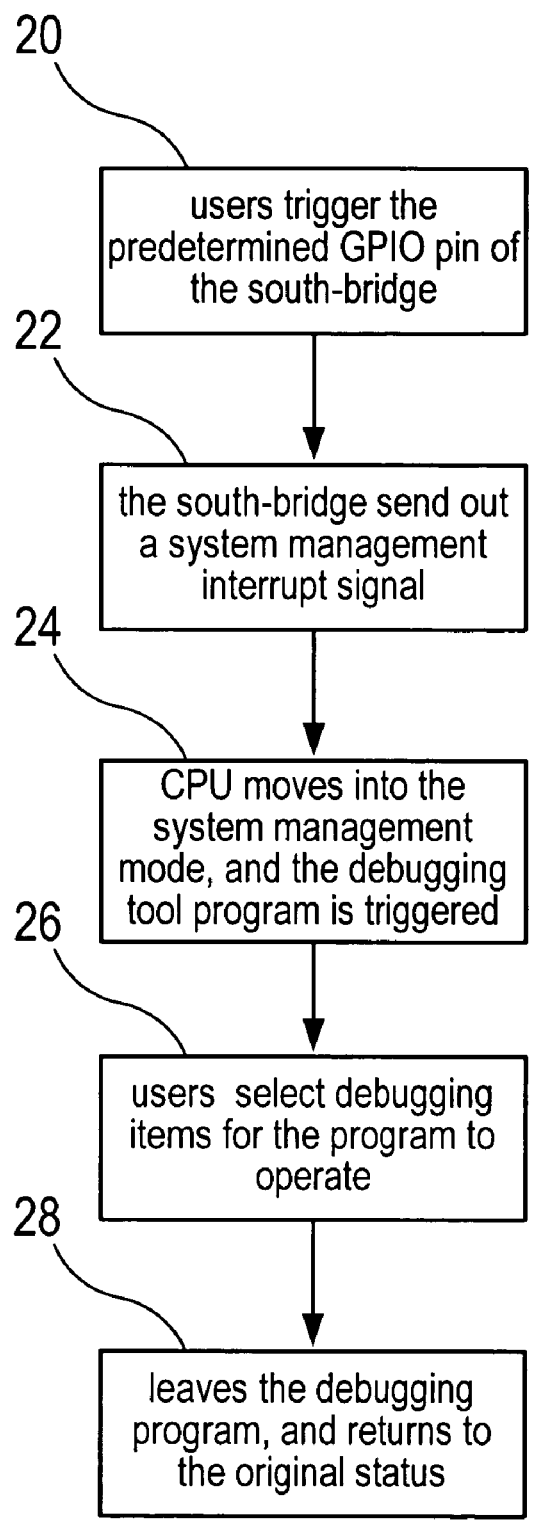
FIG. 2 is a flow diagram of a method for debugging according to one preferred embodiment of the present invention.

Firstly, referring to FIGS. 1 and 2, there are a block diagram of debugging device and a flow chart of debugging method, respectively, according to one preferred embodiment of the present invention. As shown in these figures, the computer system includes a CPU 10 connected to a north-bridge chipset 12 through the link 13. The north-bridge chipset 12 connected to a south-bridge chipset 14 through the link 15. The south-bridge chipset 14 is connected to the CPU through SMI# pin 16 and includes a plurality of general purpose input/output (GPIO) pins. As debugging, users have to select the GPIO pin 18 of the south-bridge chipset 14 and trigger the south-bridge chipset 14 to send a system management interrupt signal. As shown in step 20, the users trigger the south-bridge chipset 14 to send a system management interrupt signal through the predetermined GPIO pin 18. As shown in step 22, as the CPU receives the system management interrupt signal through SMI# pin 16, or SMI# massage through the Links 13 and 15 between chipsets, it will move into the system management mode, provided in a section of BIOS of DRAM, such that the system management mode section is provided in the BIOS and a predetermined debugging tool program is provided in the system management mode section. Thus, the debugging tool program will be triggered when CPU 10 moves into the system management mode as shown in step 24. The debugging tool program provides users a debugging operation window for operating and selecting each debugging item that includes access input/output, access memory, access device configuration and trap set for specific IO address as shown in step 26. Finally, after completing the operation and leaving the debugging operation window, the CPU will return to the original procedure to execute the next queued instruction (referring to FIG. 3), as shown in step 28.

Figure 3:
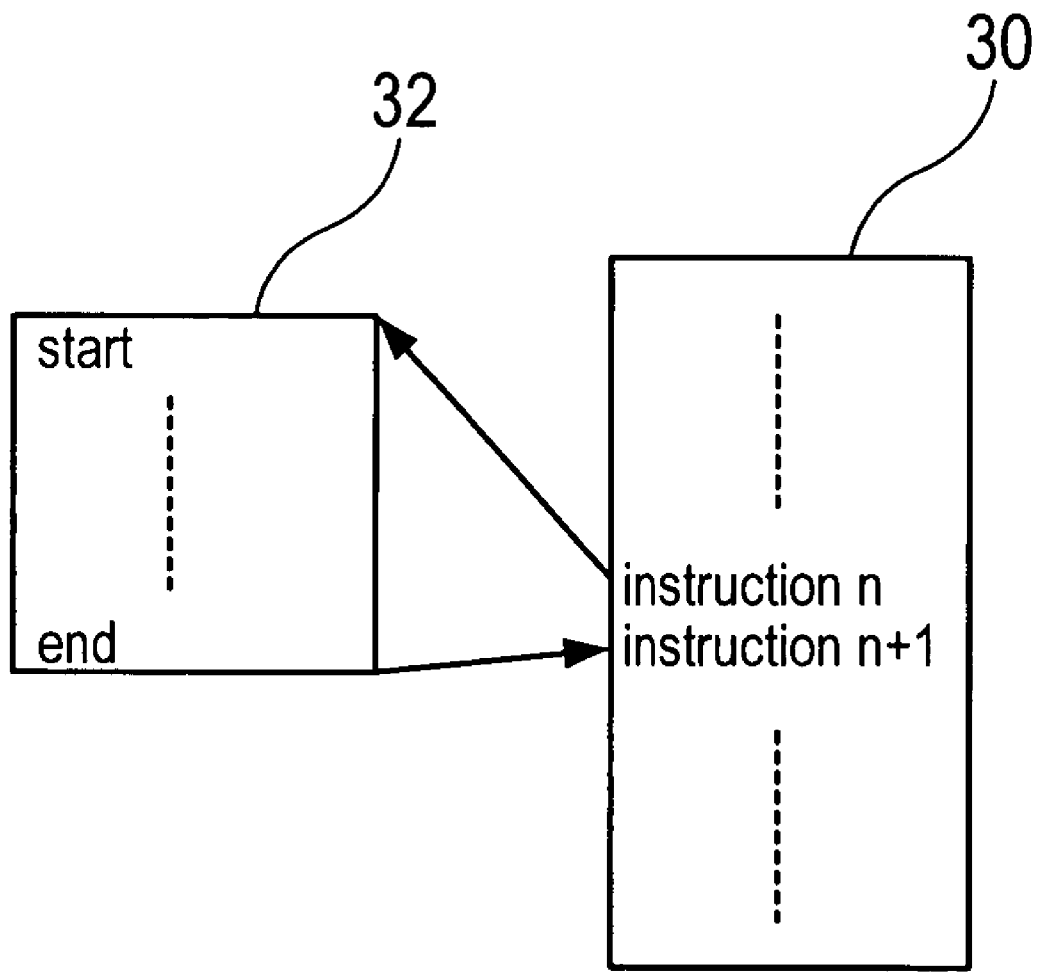
FIG. 3 is a schematic diagram of the debugging operation of the present invention transparent with the operating system.

Referring to FIG. 3, which is the schematic diagram of the debugging operation of the present invention transparent with the operating system. When the CPU executes procedure 30, the system management interrupt signal is triggered by users in instruction n. And when the execution of debugging tool program 32 is completed, the system will return to the instruction n+1 of procedure 30, to continue the execution of original procedure. Thus, the execution of original OS procedure will not be influenced, and reduce the possible bugs caused from debugging execution by the debugging tool program.

Certainly, even the execution of debugging is completed, the system management interrupt signal could be triggered by users at any time to execute debugging tool program again. Otherwise, if users have already set a trap address during the debugging procedure, then the system management interrupt signal would be triggered to pop out debugging operation window for users to debug when CPU is processing to the trap address, as to repeat from step 22 to step 28.

Since the debugging tool program is provided in the BIOS, it won't increase any the cost of product. Besides, the debugging operation window is programmable to provide more convenient advantage for users. Furthermore, it is transparent with the OS for reducing other possible bugs. The present invention is the effective method to solve the difficulties of high cost and low efficiency of debugging The device for debugging and method disclosed in the present invention has the SMI to trigger the debugging operation window, in order to execute each debugging item. Therefore the system design becomes easier, and the debugging procedure becomes simpler, which result in the purpose of being more effective and lower cost.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

LIST OF REFERENCE SYMBOLS

10 Central Processing Unit
12 north-bridge Chipset
14 south-bridge Chipset
16 circuit

What is claimed is:

1. A method for debugging in a computer system including a central processing unit connected to a North-bridge chipset and a South-bridge chipset, said method comprising:

sending a system management interrupt signal from said South-bridge chipset to said central processing unit, thereby triggering a debugging tool program;

executing said debugging tool program to pop out a debugging operation window upon said central processing unit entering a system management mode;

selecting, in said debugging operation window, and executing at least one debugging item;

setting a trap address for said debugging operation window; and leaving the debugging operation window upon an execution of said at least one debugging item has been completed;

wherein, once the debugging tool program has been executed, said central process unit returns to execution of a next queued instruction, and wherein, after leaving said debugging operation window upon the execution of said at least one debugging item has been accomplished, said debugging operation window is popped out repeatedly from said trap address each time when said South-bridge chipset is triggered.

2. The method of claim 1, wherein said at least one debugging item is selected from a group consisting of: access input and output, access memory, access device configuration and trap set for specific IO address.

3. The method of claim 1, wherein said debugging operation window is programmable.

4. The method of claim 1, wherein preceding said South-bridle chipset sending said system management interrupt signal to said central processing unit, said South-bridge chipset is triggered by users through a predetermined general purpose input/output pin.

5. A device for debugging, comprising:

a central processing unit;

a South-bridge chipset and a North-bridge chipset connected to said central processing unit, said South-bridge chipset including a system management interrupt pin for sending system management interrupt signal to said central processing unit, and a plurality of general purpose input/output pins for being triggered;

a debugging operation window having a predetermining trap address; and a unit retrieving said debugging operation window from said predetermined trap address each time said general purpose input/output pins of said South-bridge chipset are triggered.

6. The device of claim 5, wherein said central processing unit is connected with at least one memory.

7. The device of claim 6, wherein said memory comprises a system management mode section.

8. The device of claim 7, wherein said system management mode section comprises a debugging tool program.

9. The device of claim 5, wherein said system management interrupt signal is sent through said system management interrupt pin when said South-bridge chipset is triggered.

10. The device of claim 5, wherein said system management interrupt signal is sent through links between said South-bridge and North-bridge chipsets and central processing unit when said South-bridge chipset is triggered.

11. The device of claim 8, wherein said system management interrupt signal enables said central processing unit to move into said system management mode section to execute said debugging tool program.

* * * * *